US012483593B2

(12) United States Patent
Bhattacharya et al.

(10) Patent No.: US 12,483,593 B2
(45) Date of Patent: Nov. 25, 2025

(54) DISTRIBUTED HYBRID MODEL FOR SECURITY AS A SERVICE

(71) Applicant: Musarubra US LLC, San Jose, CA (US)

(72) Inventors: Anamika Bhattacharya, Bangalore (IN); Deepak Bharadwaj, Bangalore (IN); Sriranga Seetharamaiah, Bangalore (IN); Abhisek Sanyal, Bangalore (IN); Siddaraya Revashetti, Cupertino, CA (US)

(73) Assignee: Musarubra US LLC, San Jose, CA (US)

( * ) Notice: Subject to any disclaimer, the term of this patent is extended or adjusted under 35 U.S.C. 154(b) by 254 days.

(21) Appl. No.: 17/721,038

(22) Filed: Apr. 14, 2022

(65) Prior Publication Data

US 2022/0337598 A1    Oct. 20, 2022

(30) Foreign Application Priority Data

Apr. 15, 2021 (IN) .............................. 202141017560

(51) Int. Cl.
*H04L 9/40* (2022.01)
(52) U.S. Cl.
CPC .......... *H04L 63/20* (2013.01); *H04L 63/0414* (2013.01); *H04L 63/104* (2013.01); *H04L 63/108* (2013.01); *H04L 63/205* (2013.01); *H04L 63/123* (2013.01)

(58) Field of Classification Search
CPC . H04L 63/104; H04L 63/0414; H04L 63/108; H04L 63/20; H04L 63/205; H04L 63/123
See application file for complete search history.

(56) References Cited

U.S. PATENT DOCUMENTS

| | | | |
|---|---|---|---|
| 8,914,406 B1 * | 12/2014 | Haugsnes | G06F 9/45558 710/316 |
| 10,979,403 B1 | 4/2021 | Mutescu et al. | |
| 11,716,323 B1 * | 8/2023 | Moghal | H04L 63/08 726/1 |
| 2015/0347765 A1 * | 12/2015 | Hankins, Jr. | H04L 63/20 726/26 |
| 2016/0269427 A1 * | 9/2016 | Haugsnes | G06F 21/552 |
| 2016/0366184 A1 * | 12/2016 | Luo | H04L 63/0227 |
| 2017/0063930 A1 * | 3/2017 | Chesla | H04L 63/1425 |
| 2020/0119981 A1 * | 4/2020 | Guthrie | H04L 63/0272 |
| 2020/0380160 A1 * | 12/2020 | Kraus | G06F 21/577 |
| 2022/0141254 A1 * | 5/2022 | Oswal | H04L 63/101 726/1 |
| 2022/0210194 A1 * | 6/2022 | Parekh | H04L 67/10 |
| 2022/0239696 A1 * | 7/2022 | Konda | H04L 61/4511 |

* cited by examiner

*Primary Examiner* — Cheng-Feng Huang
(74) *Attorney, Agent, or Firm* — Hanley, Flight & Zimmerman, LLC

(57) ABSTRACT

An apparatus includes a network interface and a processor. The network interface receives an application programming interface (API) request, transmits a customer management request including an identifier of the customer apparatus, and receives a customer management response including a policy. The processor performs a security service on the API request, at least in part based on the policy.

20 Claims, 7 Drawing Sheets

DISTRIBUTED HYBRID MODEL FOR SECURITY AS A SERVICE

CROSS-REFERENCE TO RELATED APPLICATION

This application claims the benefit of priority under 35 U.S.C. § 119(e) to Indian Provisional Application No. 202141017560, entitled "DISTRIBUTED HYBRID MODEL FOR SECURITY AS A SERVICE," inventors Bhattacharya et al., filed in the Indian Patent Office on Apr. 15, 2021, which is hereby incorporated by reference in its entirety. This application is related to concurrently-filed applications entitled "HEURISTIC MODEL TO SELF-MANAGE AND AUTO-UPDATE CONTAINERIZED SERVICES," inventors Bhattacharya et al., U.S. application Ser. No. 17/720,860, filed in the U.S. Patent Office on Apr. 14, 2022, and "SYSTEM AND METHOD TO CREATE ZERO TRUST FRAMEWORK FOR SECURITY AS A SERVICE," inventors Bhattacharya et al., U.S. application Ser. No. 17/720,647, filed in the U.S. Patent Office on Apr. 14, 2022, both of which are hereby incorporated by reference in their entireties.

BACKGROUND

Technical Field

This disclosure relates to computer security and, in particular, a hybrid architecture for security-software-as-a-service.

Related Art

Conventionally, there have been two approaches to security: endpoint-based security solutions and cloud-native security services. Each approach faces challenges.

Specifically, endpoint-based security solutions cannot scale for all form factors, such as storage and network bandwidth. In addition, endpoint-based security solutions have a heavy footprint and need to manage policies and upgrades.

On the other hand, cloud-native security services have no centralized management of security policies and upgrades. Further, these services can require overhead to host and manage a control and management pane for the services.

Recently, software-as-a-service (SAAS) applications increasingly have been adopted, and there has been an accompanying adoption of a migration to a "cloud-oriented architecture."

BRIEF SUMMARY

An apparatus, comprising: a network interface that receives an application programming interface (API) request, transmits a customer management request including an identifier of the customer apparatus and an identifier of a security service, and receives a customer management response including a policy; and a processor configured to perform a security service on the API request, at least in part based on the policy.

DETAILED DESCRIPTION

Figure 1:
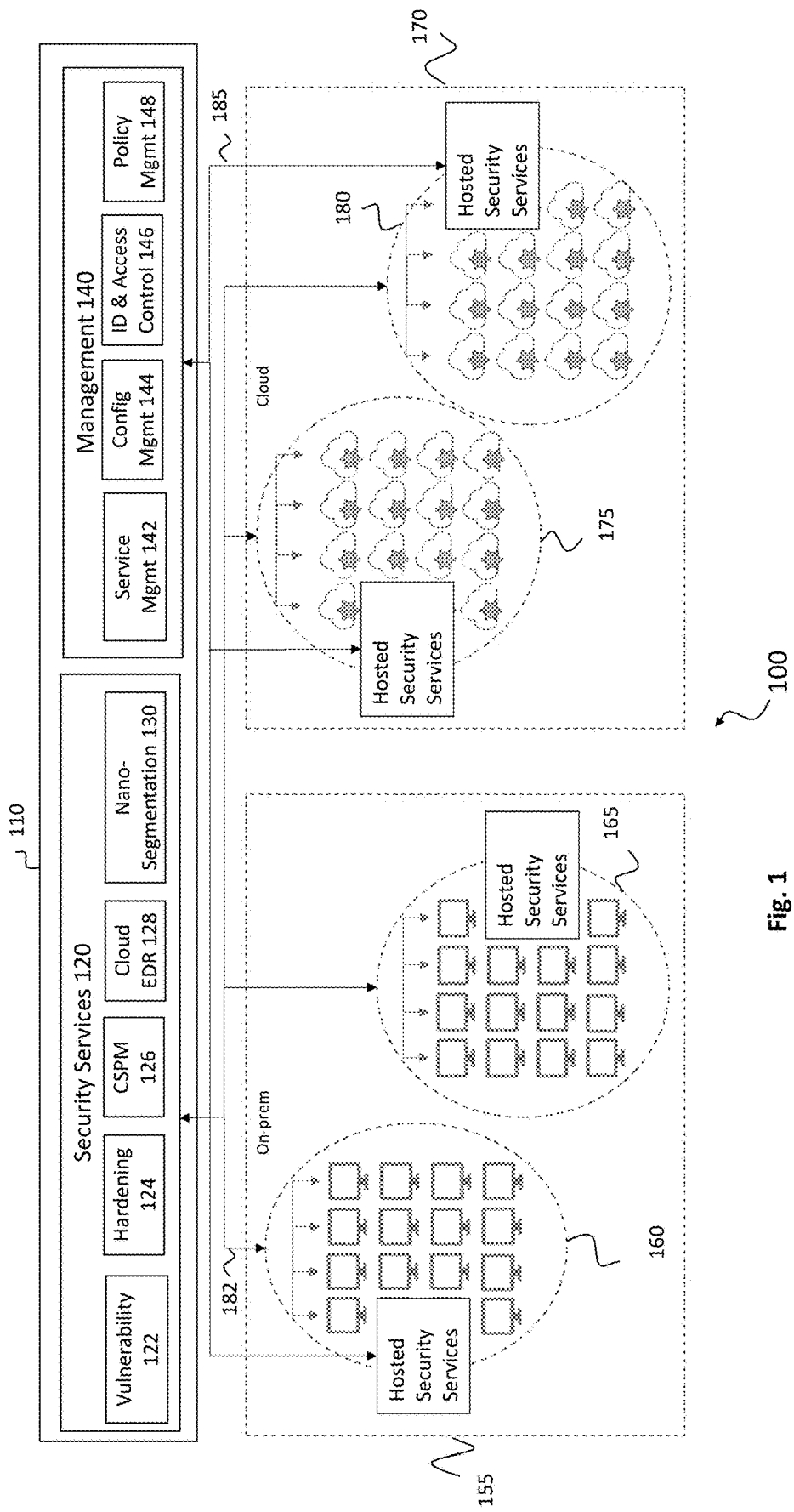
FIG. 1 depicts a block diagram for a hybrid and distributed model for SECaaS, according to various example implementations.

For purposes of illustrating the present innovation, it might be useful to understand phenomena relevant to various implementations of the disclosure. The following foundational information can be viewed as a basis from which the present disclosure can be explained. Such information is offered for purposes of explanation only and, accordingly, should not be construed to limit the scope of the present disclosure and its potential applications.

Security-as-a-service (SECaaS) is a cloud-based model, inspired by the SAAS model, in which security providers provide security services on a subscription basis. The SECaaS model offloads the security services from endpoints to a service-oriented architecture and, hence, provides a uniform and consistent protection across all the service consumers. Recently, customers are shifting from endpoint-based security to the SECaaS model.

The aforementioned endpoint-based and cloud-native security approaches do not implement a SECaaS model. In contrast, the SECaaS model can provide security services hosted as SAAS services with consistent and uniform protection and centralized security policy management. Further, SECaaS can secure workloads (e.g., compute) and cover network (e.g., segmentation, firewall) and storage (e.g., block and structured storage).

The SECaaS model presents new challenges. For example, each security request adds one network call, providing hackers an opportunity to intercept the communication.

Further, in the SECaaS model, compromise of one security service can result in a data breach of all consumers. Thus, the SECaaS model has a broad attack surface.

In addition, cloud-based security might not cater to all business models, such as businesses dealing with end-user data or other sensitive data. These businesses cannot afford a data breach from data being sent over a network.

Further still, providing SECaaS for storage purposes results in data leaving the customer boundary. Data leaving this boundary is not acceptable for a majority of customers.

The SECaaS model provides benefits including a reduced cost, uniform protection, and consistent updates. Further, some implementations of the SECaaS model do not require information technology (IT) overhead to install and manage the security solutions. Further benefits can include zero footprint and customer endpoints.

Traditional SECaaS models face challenges, because customers' data crosses a trusted network boundary to leverage the cloud security services. This model does not work well for businesses who cater to end-consumers who cannot afford to keep their data loose and vulnerable to hacker attacks.

Further, customers incur overhead in hosting the complete security service platform along with the management platform within the customer environment. Specifically, the incurred overhead can include management of policies and upgrades.

Conventionally, endpoint security solutions can provide security solutions without compromising on data privacy. However, endpoint security solutions also have a heavy footprint and do not support all form factors like network or storage.

In various implementations of the present disclosure, a system and method provide a distributed hybrid SECaaS model, managed from the cloud. Particular implementations of the distributed hybrid SECaaS model ensure that customers' sensitive data remains within the customers' trust boundaries. Further, some implementations can ensure no operational and management complexity for services by the customers' IT teams.

Various implementations create a hybrid model for SECaaS by distributing security services both across the cloud and within a customer's infrastructure. Further, all of the distributed security services (e.g., cloud and on-premises) can be managed from a single, SAAS-based management and orchestration platform. In various implementations, the hybrid model can ensure the customer's sensitive data remains within the customer's trust boundary. Thus, various implementations implement a hybrid model for SAAS-based management and orchestration.

Such a hybrid model can implement the principle that security services dealing with sensitive data should be hosted within the customer's infrastructure to ensure data privacy. Further, security services that deal with security posture, compliance, and the like, might not require sensitive information to be transferred and therefore can be hosted in the cloud.

In various implementations, security services reside both within the customer's trust boundary and in the cloud. Further, the security services can be managed by a single, cloud-based orchestration platform.

The hybrid SECaaS model can enable hybrid and distributed security services. Accordingly, in various implementations, sensitive data does not necessarily cross the customer's network boundary. Some implementations can provide centralized management for edge and cloud security services from a single, SAAS-based management platform. Particular implementations can bring security closer to the customer and, thereby, can achieve faster detection and remediation of security issues. Further, because the hybrid model includes a cloud aspect, the model can work across all form factors (e.g., compute, network and storage), and across both public clouds and private clouds. Various implementations can continuously evaluate the security posture of workloads based on both edge- and cloud-based security services.

FIG. 1 depicts a block diagram for a hybrid and distributed model 100 for SECaaS, according to various example implementations. In various implementations, the hybrid and distributed model 100 covers two logical boundaries: a security vendor's infrastructure 110 and customer's infrastructure 150.

As shown in FIG. 1, the security vendor's infrastructure 110 includes a security services 120 and a management layer (e.g., management console) 140. The security services 120 can include a vulnerability assessment service 122, a hardening service 124, a cloud security posture management (CSPM) service 126, a cloud endpoint detection and response (EDR) service 128, and a nano-segmentation service 130. The security services 120 can include additional or alternative services, as well. The management layer 140 can include a service management module 142, a configuration management module 144, an identity and access control module 146, and a policy management module 148.

The customer's infrastructure 150 can include the on-premises workloads 155 and a cloud infrastructure 170. The on-premises workloads 155 can include a first hosted security services network 160 and a second hosted security services network 165. The cloud infrastructure 170 can include a first hosted security services network 175 and a second hosted security services network 180. Thus, as shown in FIG. 1, hosted security services are present within the customer's on-premises infrastructure 155 and within the customer's cloud infrastructure 170.

In various implementations, the hosted security services 160, 165, 175, 180 deal with the customer's sensitive data. These security services are hosted within the customer's infrastructure (e.g., within the on-premises workloads 155 or cloud infrastructure 170) and yet can be managed from the management layer 140 in the cloud. This management eliminates the overhead from IT teams to manage and orchestrate these security services.

Some examples of hosted security services are anti-malware for workloads (e.g., virtual machines [VMs], containers, or storage) and data loss prevention (DLP).

A communication channel 182 enables communication between the security services 120 and the hosted security services 160, 165, 175, 180. Further, a secure communication channel 185 enables communication from the security vendor infrastructure 110 to the hosted security services 160, 165, 175, 180.

In various implementations, this model can overcome the challenges with traditional SECaaS models and endpoint security solutions described above.

Thus, various implementations of a system include a hybrid model, in which security services are distributed across the customer perimeter (e.g., within customer infrastructure 150) and cloud (e.g., within security vendor infrastructure 110). The security services (e.g., cloud security services 120 and hosted services 160, 165, 175, 180) can be managed from a single, SAAS-based management layer 140. Select implementations of this model can ensure that services dealing with sensitive data remain within the customer's trust boundary. Further, particular implementations can ensure that services that deal with compliance, security postures, and threat intelligence can be performed in the cloud.

As discussed previously, the security vendor infrastructure 110 in various implementations includes security services 120. The security services 120 can be security services provided by the security vendor to a customer and can be based on application programming interfaces (APIs). In various implementations, the security services can perform security assessments without collecting sensitive data from the cloud infrastructure 170 or on-premises workloads 155. Instead, the security services can assess security posture and compliance status of workloads and infrastructure using non-sensitive data. The cloud APIs or points-of-presence deployed on the workloads can collect this non-sensitive data. In select implementations, security services that serve as sources for threat intelligence, continuous risk assessment, and scoring for the customer's infrastructure 150 can also be hosted as part of security services 120.

As discussed above, in various implementations, the security vendor's infrastructure 110 includes a management component 140 that can implement a management/orchestration layer.

In various implementations, the management/orchestration layer serves as an orchestration pane for the hybrid security services (e.g., security services 120) and distributed (e.g., services 160, 165, 175, 180) security services. Thus, the management/orchestration layer can provide a single point of control for all the security services. In various implementations, the management/orchestration layer deals with policies, identity and access management, configurations, and schedules for both hybrid and distributed security services. These security services can be either hosted in the customer's premises (as in 155) or in the cloud (as in 170). In some implementations, a user or customer can configure security policies from a single management console (e.g., management layer 140), regardless of where the security services are deployed. This centralized management provides a uniform and consistent experience to service customers across the public cloud infrastructure 170 and on-premises workloads 155.

In an example implementation, the management layer 140 can define a scan configuration and policies for malware scans. Because the management layer 140 is centralized, the scan configuration and policies can be made uniform across the hybrid cloud. The customer's infrastructure 150 can include, within either the on-premises workloads 155 or the cloud infrastructure 170, a point-of-presence hosting the malware scanner (e.g., a service 160). The point-of-presence can receive the policies from the management pane of the management layer 140. The point-of-presence can perform malware scans based on the unified policies received from the management pane. That is, the point-of-presence can perform malware scans similar to those performed by security services 120 without transferring files outside the customer's network boundary. As a result, security can be achieved without compromising on data privacy.

Thus, in some implementations, the model can provide security services to the workloads, without customer data leaving the network boundary. Also, in some implementations, a single, cloud-based management platform can manage both the cloud security services and edge security services.

Figure 2:
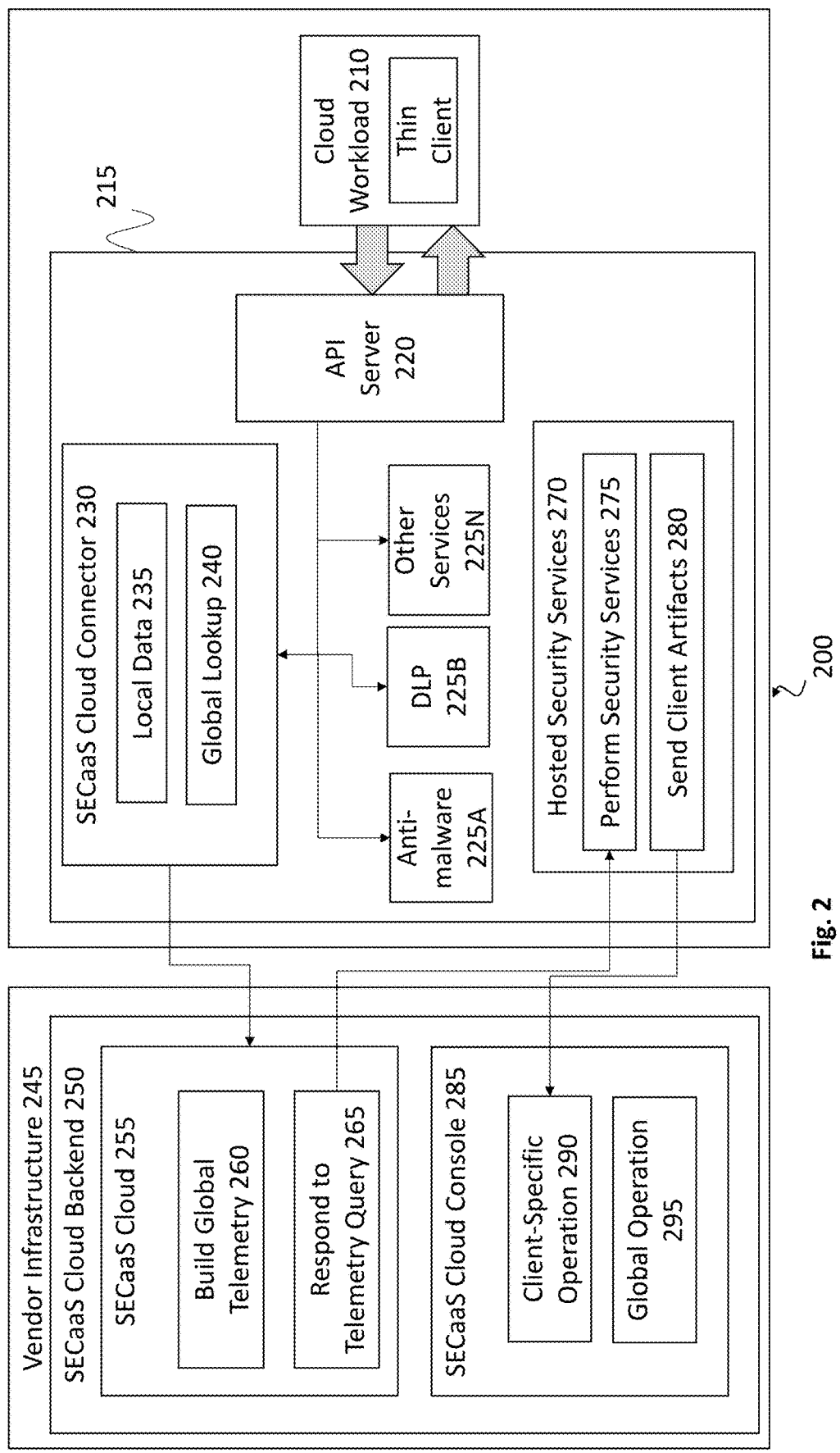
FIG. 2 illustrates a logical view according to one implementation of the present disclosure.

FIG. 2 illustrates a logical view 200 according to one implementation of the present disclosure. The logical view 200 includes customer infrastructure 205 and SECaaS vendor infrastructure 245.

The customer infrastructure 205 includes cloud workloads 210 and a point-of-presence (POP) 215. The cloud workloads 210 can originate from virtual machines (VMs), containers, or from server-less implementations. In some implementations, the cloud workloads 210 can include a thin client.

The POP 215 hosts a SECaaS hybrid model, as shown in FIG. 1. The POP can be implemented, for example, in a Kubernetes environment. The cloud workloads 210 send API requests to the POP 215.

The POP 215 includes an API server 220, security services 225A, 225B, . . . 225n, a SECaaS cloud connector 230, and hosted security services 270. The API server 220 receives the API request from the cloud workloads 210. The API server 220 then forwards the API request to at least one of security services 225A, 225B, . . . 225n. In one implementation, the security services can include an anti-malware service 225A, a DLP service 225B, and other security services 225n.

The SECaaS cloud connector 230 can intercept the API request forwarded by the API server 220. In various implementations, the SECaaS cloud connector 230 can perform at least two operations: a local data operation 235 and a global lookup 240.

The local data operation 235 can separate sensitive data (e.g., internet protocol [IP] addresses, tags, user identifiers) from non-sensitive data (e.g., checksums, workload configurations). Some examples of these workload configurations are an allowed password length, whether special characters are allowed for a password, and which special characters are allowed for a password.

Thus, the telemetry data sent by the SECaaS cloud connector 230 to the SECaaS vendor infrastructure 245 is not sensitive data: that is, the telemetry data does not include client-specific attributes. Accordingly, various implementations of the hybrid model can guarantee the sensitive data is retained locally (e.g., within the customer infrastructure 205). The customer environment can store the telemetry data locally along with a global policy.

The global lookup 240 can perform a lookup of global telemetry data by sending to the SECaaS vendor infrastructure 245 the global telemetry data. The global telemetry data can include open source vulnerabilities, global threat intelligence (GTI) checksum lookups, hardening configurations, CSPM configurations, and other threat intelligence telemetry data. In addition, the global telemetry data lookup can be based at least partially on lookup policy settings.

The SECaaS vendor infrastructure 245 receives the global telemetry data included in the lookup. The SECaaS vendor infrastructure includes a SECaaS cloud backend 250 that includes SECaaS cloud 255 and SECaaS cloud console 285.

The SECaaS cloud 255 includes two operations: building 260 global telemetry data and responding 265 to global telemetry queries. The SECaaS cloud 255 performs the building 260 by receiving and maintaining an up-to-date vulnerability database, up-to-date open source vulnerability data, an up-to-date CSPM database, an up-to-date hardening database, and other up-to-date threat intelligence. This data can be received from developers and/or vendors. In some implementations, this data can be received from the SECaaS vendor itself.

The SECaaS cloud 255 then responds 265 to the global telemetry lookup received from the SECaaS cloud connector 230. In particular, the SECaaS cloud 255 sends a response to the lookup, at least partially based on the data built in the building 260. The SECaaS cloud 255 can send the response to the POP 215.

The hosted security service 270 of the POP 215 receives the response from the SECaaS cloud 255. The hosted security service 270 performs two operations: performing 275 the security service and sending 280 a client artifact to the SECaaS vendor infrastructure 245. The security service can include, for example, scanning file content, scanning an IP address range, and/or analyzing tags. In one implementation of the performing 275, the hosted security service 270 locally scans the customer-sensitive telemetry data, based on the response received from the SECaaS cloud backend 250. Thus, the hosted security service 270 can be performed, without sensitive data leaving the boundary of the customer infrastructure 205.

In the sending 280, the hosted security service 270 transmits a client artifact of the performing 275 to the SECaaS vendor infrastructure 245. The artifact can include, for example, the name of a detected threat, a file including the detected threat, an identified vulnerability, and information regarding a hardening check failure.

The SECaaS cloud console 285 receives the client artifact from the hosted security service 270. The SECaaS cloud console 285 is a portion of the global management performed by the SECaaS vendor infrastructure 245.

The SECaaS cloud console 285 performs two operations: a client-specific operation 290 and a global operation 295. In the client-specific operation 29o, the SECaaS cloud console 285 receives the client artifact transmitted by the hosted security service 270. The SECaaS cloud console 285 can then store the client artifact at least in part based on the customer and the POP 215. Thus, in some implementations, the SECaaS cloud console 285 can store the client artifact on a per-tenant basis. Accordingly, select implementations of the SECaaS cloud console 285 can form aggregation patterns on the artifact. Some examples of aggregation patterns include the distribution of threats within the customer infrastructure 205 reporting to the POP 215 and/or the distribution of vulnerabilities within the customer infrastructure 205 reporting to the POP 215.

The global operation 295 performs global policy management across all POPs in a tenant. For example, the global operation 295 can manage policies in POPs within the customer infrastructure 205 other than POP 215. Further, the global operation 295 of the SECaaS cloud console 285 can provide a global view of artifacts across all POPs. In some implementations, this global view can consider artifacts from tenants other than the customer of customer infrastructure 205. In this regard, the SECaaS cloud console 285 can build 260 the global telemetry data, at least in part based on the client artifact.

Figure 3A:
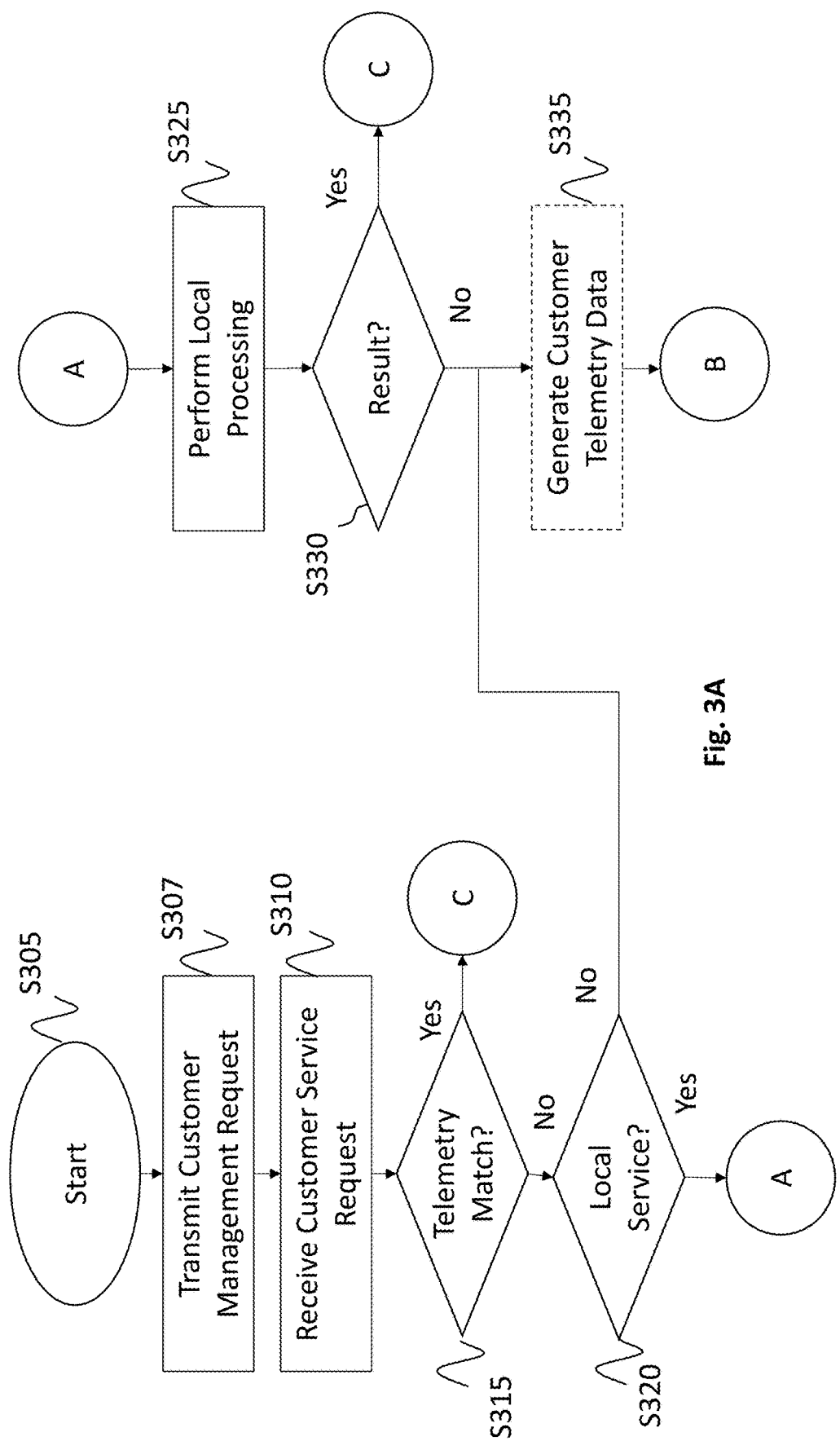
FIGS. 3A and 3B illustrate an algorithm for a workflow performed by a point-of-presence in an implementation of the present disclosure.
Figure 3B:
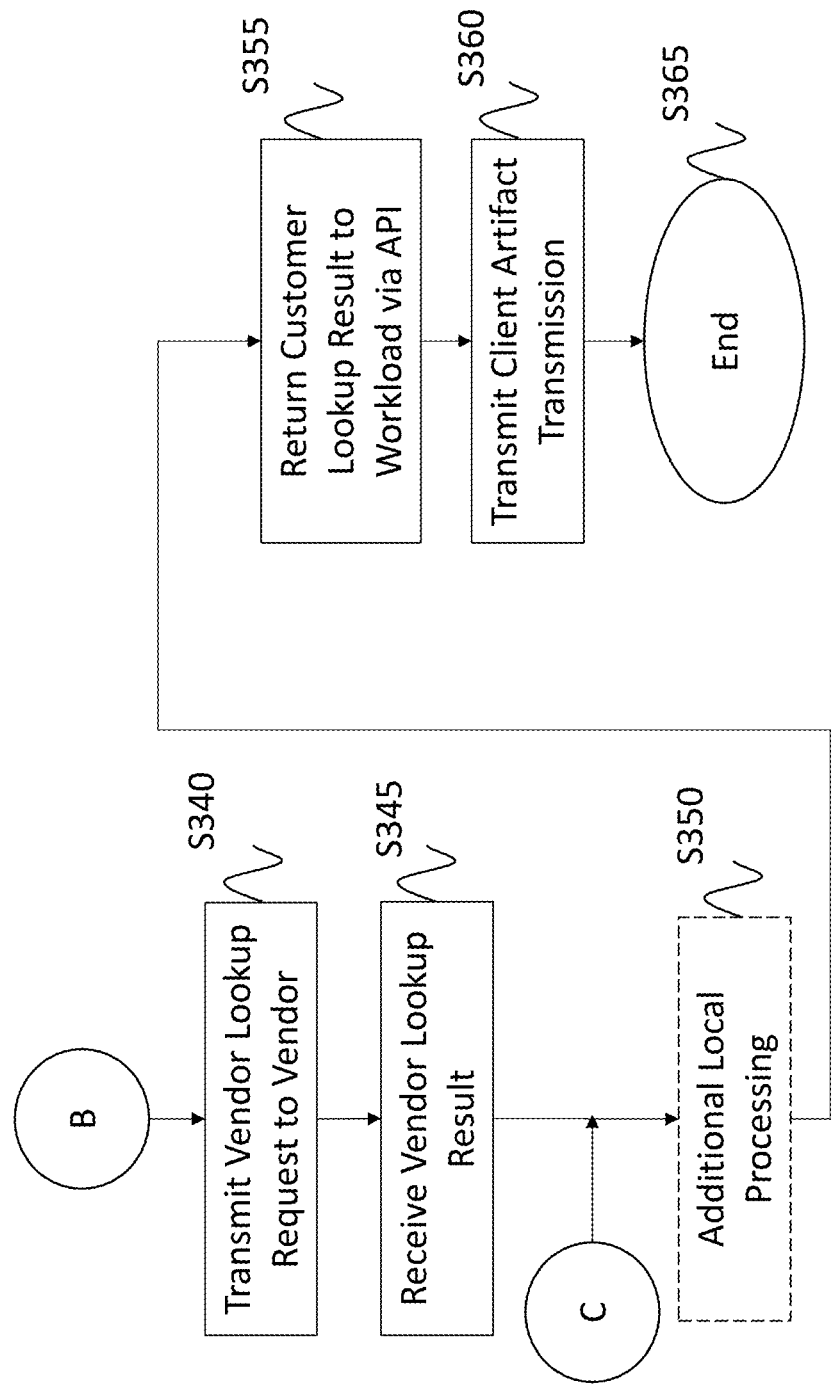

FIGS. 3A and 3B illustrate an algorithm 300 for a workflow performed by the POP 215 in an implementation of the present disclosure. The algorithm 300 begins at S305 and then advances to S307.

In S307, the POP 215 transmits a customer management request to the SECaaS vendor infrastructure 245. The customer management request can include an identifier of the POP 215, an identifier of a security service, and at least one customer preference for the security service. The POP 215 can also receive, from the SECaaS vendor infrastructure, a policy for the security service. The algorithm 300 then advances to S310.

In S310, the POP 215 receives a customer service request including customer telemetry data from the cloud workload 210. The customer service request can be or include an API call to one of security services 225A, 225B, . . . 225*n*.

The customer service request can include sensitive data and/or non-sensitive data. An example of sensitive data is a file including personally identifiable information. An example of non-sensitive data is a checksum of such a file. That is, the non-sensitive data itself does not personally identify an entity. The algorithm 300 then advances to S315.

In S315, the POP 215 determines whether the customer telemetry data matches predetermined telemetry data. For example, the POP 215 determines whether the checksum of the file processed by the cloud workload 210 matches a checksum stored within the customer infrastructure 205.

If the POP 215 determines the customer telemetry data matches the predetermined telemetry data, then the POP 215 can lookup a processing to be performed based on the predetermined telemetry data and can perform the processing to produce a result. The algorithm 300 then advances to S350.

If the POP 215 determines the telemetry data received in S310 does not match the predetermined telemetry data, then the algorithm 300 then advances to 320.

In S320, the POP 215 can determine whether a local service can perform the service for the customer service request. If the POP 215 determines a local service cannot perform the service, then the algorithm 300 advances to S335.

If the POP 215 determines a local service can attempt to perform the service, then the algorithm 300 advances to S325.

In S325, the POP 215 performs a local security service identified by the customer service request, such as anti-malware service 225A or DLP service 225B. Thus, the POP 215 attempts to service the customer service request by performing local processing based on a telemetry match in S315 or by the local service performing the processing in S325.

In this regard, the algorithm 300 can be considered to use the various form factors of the POP 215. For example, the POP 215 includes a memory that stores an executable application and/or variables for the local security service. Further, the POP 215 can include a controller that performs the local security service. For example, the controller of the POP 215 can produce a checksum for the local security service.

The algorithm 300 then advances to S330.

In S330, the POP 215 determines whether a result was obtained from the local service. If the POP 215 determines that a result was obtained from the local service, then the algorithm 300 advances to S350.

If the POP 215 determines a result was not obtained from the local service, then the algorithm 300 advances to S335.

In S335, the POP 215 optionally generates vendor telemetry data to be transmitted to the SECaaS vendor infrastructure 245. More specifically, the telemetry data received in S310 can include data that should be retained within the customer infrastructure 205. Thus, the POP 215 can optionally generate the vendor telemetry data, at least in part based on the file included in the customer telemetry data received in S310. The algorithm 300 then advances to S340.

In S340, the customer infrastructure 205 transmits a vendor lookup request (e.g., vendor service request) to the SECaaS vendor infrastructure 245. The vendor lookup request can include an identifier of a security service to be performed by the SECaaS vendor infrastructure. The vendor lookup request can also include the vendor telemetry data generated in S335. In some implementations, the vendor lookup request can include at least a portion of the customer telemetry data, if the portion of the customer telemetry data accords with the customer's data protection objectives. Further, the vendor lookup request can include an identifier of the POP 215 (e.g., a POP ID). The algorithm 300 then advances to S345.

In S345, the POP 215 receives a vendor lookup result from the SECaaS vendor infrastructure 245, for example. The vendor lookup result can be or include a result produced by the SECaaS vendor infrastructure 245, at least in part based on the vendor lookup request.

In some implementations, the vendor lookup result can include a result, such as a confirmation as to the security and compliance of a password. In various implementations, the vendor lookup result can include data for additional local processing. Further, the vendor lookup result can include a vendor lookup ID.

The algorithm 300 then advances to optional S350.

In S350, the POP 215 can perform local processing, at least in part based on the data included in the vendor lookup result. For example, the anti-malware service 225A can scan the content of the file received in S310, at least in part based on the data included in the vendor lookup result.

Thus, the POP 215 can perform a local processing on sensitive data and leverage a result of a remote processing performed by the vendor on non-sensitive data. Thus, the POP 215 can produce a customer lookup result (e.g., customer service result) that serves the API request, while maintaining the sensitive data within the POP 215. The algorithm 300 then advances to S355.

In S355, the POP 215 returns the customer lookup result to the workload. The algorithm 300 then advances to S360.

In S360, the POP 215 performs a client artifact transmission to the SECaaS vendor infrastructure 245. The transmission can include a client artifact produced by the local processing. The transmission can also include the vendor lookup ID. The algorithm 300 then advances to S365, in which the algorithm 300 concludes.

Thus, the POP 215 can process the file received in S310 without transmitting the file to the SECaaS vendor infrastructure 245.

Figure 4:
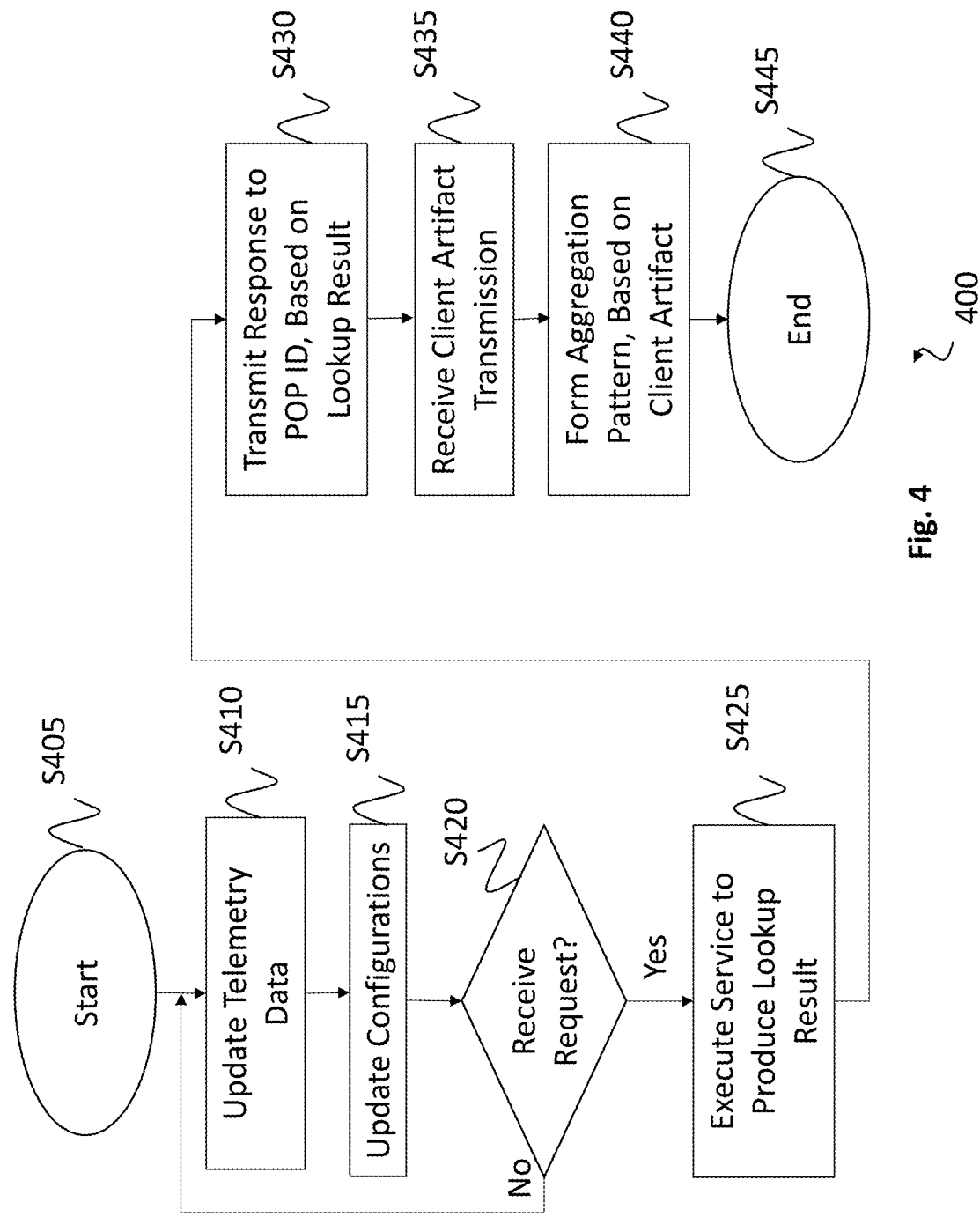
FIG. 4 illustrates an algorithm performed by a SECaaS vendor infrastructure, according to at least one implementation of the present disclosure.

FIG. 4 illustrates an algorithm 400 performed by the SECaaS vendor infrastructure 245, according to at least one implementation of the present disclosure.

The algorithm 400 begins at S405 and advances to S410.

In S410, the SECaaS vendor infrastructure 245 updates telemetry data stored in a memory to produce updated telemetry data. For example, the SECaaS vendor infrastructure 245 can update a vulnerability database, open-source vulnerability data, a CSPM database, a hardening database, and/or other threat intelligence. In many implementations, these updates are provided by software vendors. The algorithm 400 then advances to S415.

In S415, the SECaaS vendor infrastructure 245 updates configurations stored in a memory. For example, the SECaaS vendor infrastructure 245 can update the configurations of the POP 215. The algorithm 400 then advances to S420.

In S420, the SECaaS vendor infrastructure 245 determines whether it has received a vendor lookup request. In many implementations, the vendor lookup request includes customer telemetry data and a POP ID.

If the SECaaS vendor infrastructure 245 determines it has not received a vendor look up request, then the algorithm 400 returns to S410 to continue updating.

If the SECaaS vendor infrastructure 245 determines it has received a vendor lookup request, then the algorithm 400 advances to S425.

In S425, in select implementations, the SECaaS vendor infrastructure 245 can determine a configuration of the configurations updated in S415, at least in part based on the POP ID.

Further, according to some implementations, the SECaaS vendor infrastructure 245 executes a service, at least in part based on the customer telemetry data and the vendor telemetry data. Of course, in some implementations, the SECaaS vendor infrastructure 245 executes the service, at least in part additionally based on the determined configuration. The SECaaS vendor infrastructure executes the service to produce a lookup result.

For example, the SECaaS vendor infrastructure 245 can lookup a checksum included in the customer telemetry data. Thus, the lookup result can indicate whether a file having the checksum is malware.

In some implementations, the SECaaS vendor infrastructure 245 can determine a configuration of customer infrastructure 205 based on the POP ID. In some implementations, the SECaaS vendor infrastructure can then determine whether a password included in the customer telemetry data complies with the configuration of the customer infrastructure 205. Thus, the lookup result can indicate whether the password complies with the configuration.

In some implementations, the lookup result can be or include a policy or malware definitions for the customer infrastructure 205.

The algorithm 400 then advances to S430.

In S430, the SECaaS vendor infrastructure 245 transmits a vendor lookup response to the POP ID. The vendor lookup response can be based at least partially on the lookup result produced in S425. The vendor lookup response can include a vendor lookup ID. The algorithm 400 then advances to S435.

In S435, a network interface of the SECaaS vendor infrastructure 245 receives a client artifact transmission from the customer infrastructure 205. The client artifact transmission can include, for example, a checksum of a file determined by the POP 215 to be malware, based on a policy transmitted in S430. The client artifact transmission also can include the vendor lookup ID. The algorithm 400 then advances to S440.

In S440, the controller of the SECaaS vendor infrastructure 245 forms an aggregation pattern, at least in part based on the client artifact received in S435. For example, the controller can determine a context for the artifact, at least in part based on the vendor lookup ID. In some implementations, the context can be "malware" or "password" or the like. The context is not limited to text descriptions.

In one implementation, the artifact is a checksum of a file determined to be malware. Thus, the controller can update the vendor telemetry data, based on the checksum and the context.

The algorithm 400 then advances to S445 and concludes.

In many implementations, the controller of the SECaaS vendor infrastructure can update the vendor telemetry data, at least in part based on the aggregation pattern. Thus, when performing the algorithm 400 again, the controller can execute a second service in S425, at least in part based on the aggregation pattern formed in S440.

Figure 5:
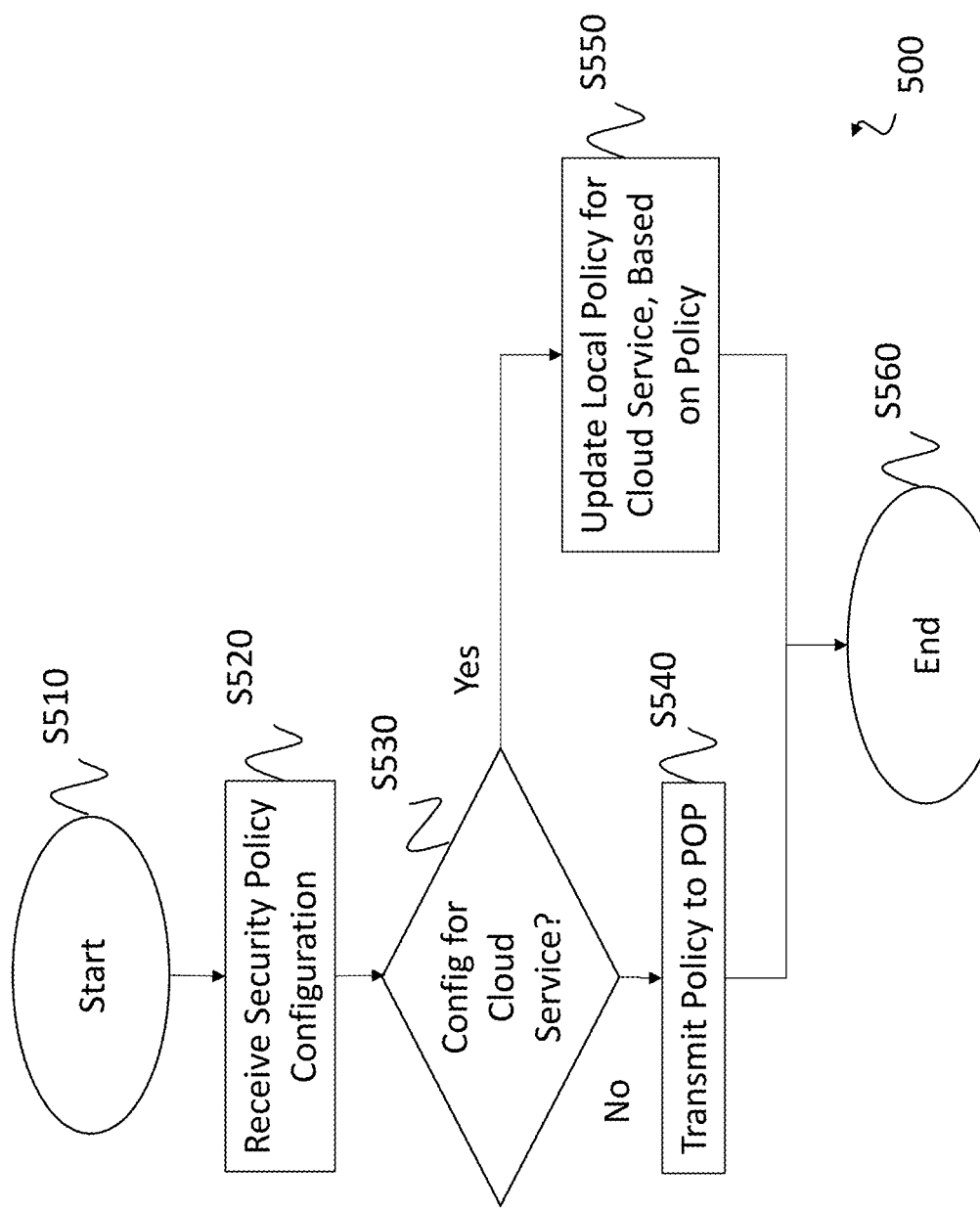
FIG. 5 illustrates an algorithm performed by a SECaaS vendor infrastructure, according to an implementation of the present disclosure.

FIG. 5 illustrates an algorithm 500 performed by a SECaaS vendor infrastructure, according to an implementation of the present disclosure. The algorithm begins at S510 and advances to S520.

In S520, the SECaaS vendor infrastructure 245 receives a security policy configuration from the POP 215. The security policy configuration includes an identifier of the POP 215 and an identifier of a security service. The algorithm 500 then advances to S530.

In S530, the SECaaS vendor infrastructure 245 determines whether the security service is implemented on the SECaaS vendor infrastructure 245. If the SECaaS vendor infrastructure 245 determines the security service is implemented on the SECaaS vendor infrastructure 245, then the algorithm 500 advances to S550. If the SECaaS vendor infrastructure 245 determines the security service is not implemented on the SECaaS vendor infrastructure 245 (e.g., the security service is implemented on the customer infrastructure 205), then the algorithm 500 advances to S540.

In S540, the SECaaS vendor infrastructure 245 updates a policy for the POP 215, at least in part based on the identifier of the security service. The SECaaS vendor infrastructure 245 then transmits the security policy, at least in part based on the identifier of the POP 215. For example, the SECaaS vendor infrastructure transmits the security policy to the POP 215. The algorithm 500 then advances to S560.

In S550, the SECaaS vendor infrastructure 245 updates a policy for the SECaaS vendor infrastructure 245 itself, at least in part based on the identifier of the security service.

Thus, when the SECaaS vendor infrastructure receives a service request for the security service from the POP 215, the SECaaS vendor infrastructure can perform the service according to the customer's preferences. The algorithm 500 then advances to S560.

In S560, the algorithm 500 concludes.

Figure 6:
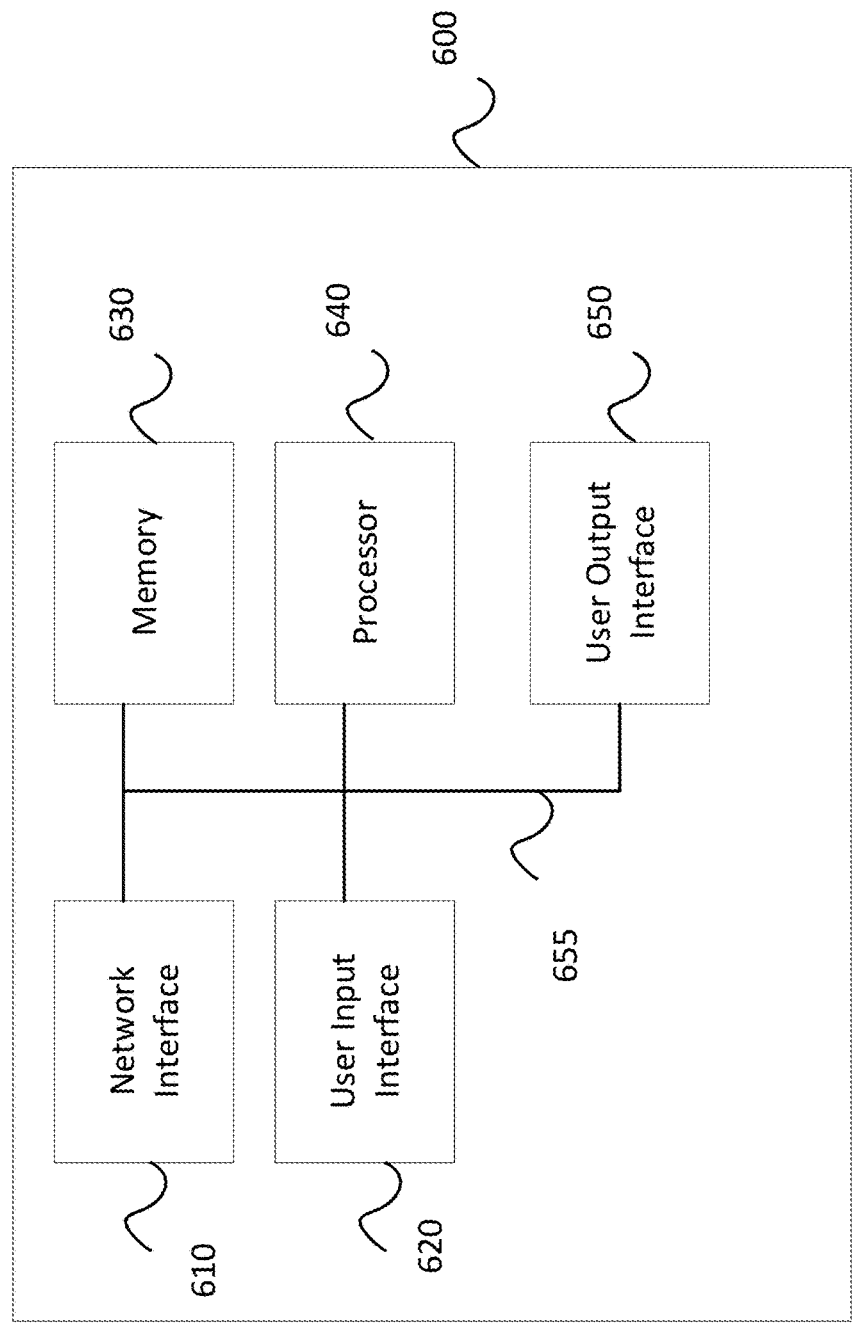
FIG. 6 illustrates a computing device, according to an implementation of the present disclosure.

FIG. 6 illustrates a computing device 600, according to an implementation of the present disclosure.

Although illustrated within a single housing, the computing device 600 can be distributed across plural housings or sub-systems that cooperate in executing program instructions. In some implementations, the computing device 600 can include one or more blade server devices, standalone server devices, personal computers (including laptop computers and tablet computers), routers, hubs, switches, bridges, firewall devices, intrusion detection devices, mainframe computers, network-attached storage devices, video game systems, smartphones and other mobile telephones, and other computing devices. The computing device 600 can execute the Windows® operating system (OS) in many implementations. The hardware of the computing device 600 can be configured according to a Symmetric Multi-Processing (SMP) architecture or a Non-Uniform Memory Access (NUMA) architecture.

The computing device 600 can include a network interface 610 that provides one or more communication connections and/or one or more devices that allow for communication between the computing device 600 and other computing systems (not shown) over a communication network or collection of networks (not shown) or the air. The network interface can communicate using near-field communications (NFC), Wi-Fi™, Bluetooth, Ethernet, cellular (e.g., 4G, 5G), facsimile, or any other wired or wireless interface.

The computing device 600 can also include a user input interface 620 that receives inputs from a human. The user input interface 620 can be or include a mouse, a touchpad, a keyboard, a touchscreen, a trackball, a camera, a microphone, a joystick, a game controller, a scanner, or any other input device.

The computing device 600 can include a memory 630, also termed a "storage." The memory 630 can include or be one or more computer-readable storage media readable by a processor 640 and that store software. The memory 630 can be implemented as one storage device and can also be implemented across multiple co-located or distributed storage devices or sub-systems. The memory 630 can include additional elements, such as a memory controller, that communicate with the processor 640. The memory 630 can also include storage devices and/or sub-systems on which data and/or instructions are stored. The computing device 600 can access one or more storage resources to access information to carry out any of the processes indicated in this disclosure and, in particular, FIGS. 3A-3B and 4-5.

The memory 630 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 630 can be or include resistive RAM (RRAM) or a magneto-resistive RAM (MRAM). Other implementations are possible.

A program for implementing a distributed hybrid model for SECaaS can be stored in the memory 630 and can be implemented in program instructions. Such a program can include routines for at least partially performing at least one of the processes illustrated in FIGS. 3A-3B and 4-5. Further, the software, when executed by the computing device 600 in general or the processor 640 specifically, can direct, among other functions, the computing device 600 or the processor 640 to implement the distributed hybrid model for SECaaS as described herein.

The computing device 600 can include the processor 640 (e.g., a processing unit). The processor 640 can perform the operations of SECaaS cloud backend 250 and/or the POP 215. The processor 640 can be or include one or more hardware processors and/or other circuitry that retrieve and execute software from the memory 630. The processor 640 can be implemented within one processing device, chip, or package and can also be distributed across multiple processing devices, chips, packages, or sub-systems that cooperate in executing program instructions. In some implementations, the processor 640 is or includes a Graphics Processing Unit (GPU).

The processor 640 can have any register size, such as a 32-bit register or a 64-bit register, among others. The processor 640 can include multiple cores. Implementations of the processor 640 are not limited to any particular number of threads. The processor 640 can be fabricated by any process technology, such as 14 nm process technology.

The computing device 600 can also include a user output interface 650 that outputs information to a human user. The user output interface 650 can be or include a display (e.g., a screen), a touchscreen, speakers, a printer, or a haptic feedback unit. In many implementations, the user output interface 650 can be combined with the user input interface 620 to include, for example, a touchscreen or a headset including headphones and a microphone.

The computing device 600 also includes a bus 655. The components of computing device 600 can communicate with each other via the bus 655

In implementations including multiple computing devices, a server of the system or, in a serverless implementation, a peer can use one or more communications networks that facilitate communication among the computing devices. For example, the one or more communications networks can include or be a local area network (LAN), a wide area network (WAN), or a metropolitan area network (MAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, and cache memory, and to transitory storage media, such as carrier waves or propagating signals.

Aspects of the distributed hybrid model for security-as-a-service can be implemented in various manners (e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various implementations, different operations and portions of the operations of the algorithms described can be performed by different processing units. Furthermore, aspects of the present disclosure can take the form of a computer program product implemented in one or more computer-readable media having computer-readable program code implemented, e.g., encoded or stored, thereon. In various implementations, such a computer program can, for example, be downloaded (or updated) to existing devices and systems or be stored upon manufacture of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, particular implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve the developer's specific goals, including compliance with system, business, and/or legal constraints that can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, and supporting chipsets) and computer-readable memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application-specific hardware of electronic devices.

Implementations of the present disclosure can be readily included in a system-on-chip (SOC) package. An SOC represents an integrated circuit (IC) that integrates components of a computer or other electronic system into one chip. The SOC can contain digital, analog, mixed-signal, and radio frequency functions on one chip substrate. Other implementations can include a multi-chip-module (MCM) with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), a programmable logic array (PLA), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In some cases, it is clearer to describe one or more of the functionalities of a given set of flows by referencing a reduced number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementations," "an implementation," "another implementation," "some implementations," "various implementations," "other implementations," "alternative implementation," and the like are intended to mean that any such features are included in one or more implementations of the present disclosure and might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example A1, an apparatus includes a network interface that receives an application programming interface (API)

request, transmits a customer management request including an identifier of the customer apparatus and an identifier of a security service, and receives a customer management response including a policy; and a processor configured to perform the security service on the API request, at least in part based on the policy.

Example A2 is the apparatus of Example A1, wherein the network interface transmits a vendor service request including non-sensitive data, receives a vendor service response including a vendor service result, and transmits an API response, and the API response is at least in part based on the vendor service result.

Example A3 is the apparatus of Example A2, wherein the API request further includes sensitive data, the processor is further configured to perform the security service on the sensitive data to produce a customer service result, and the API response is at least in part based on the customer service result.

Example A4 is the apparatus of Example A3, wherein the processor further is configured to perform the security service on the sensitive data, at least in part based on the policy.

Example A5 is the apparatus of any of Examples A1-A4, wherein the network interface transmits a policy request, at least in part based on a receipt of the API request.

Example A6 is the apparatus of any of Examples A2-A4, wherein the API request further includes sensitive data, the processor further is configured to produce the non-sensitive data from the sensitive data, at least in part based on the policy.

Example A7 is the apparatus of any of Examples A1-A6, wherein the processor further is configured to perform the security service on the API request to produces a client artifact, and the network interface transmits the client artifact.

In Example A8, a method includes receiving an application programming interface (API) request; transmitting a customer management request including an identifier of an apparatus and an identifier of a security service; receiving a customer management response including a policy; and performing the security service on the API request, at least in part based on the policy.

Example A9 is the method of Example A8, further comprising: transmitting a vendor service request including non-sensitive data; receiving a vendor service response including a vendor service result; and transmitting an API response, at least in part based on the vendor service result.

Example A10 is the method of Example A9, further comprising: performing the security service on sensitive data to produce a customer service result, wherein the API request further includes the sensitive data, and the API response is at least in part based on the customer service result.

Example A11 is the method of Example A10, wherein the performing the security service on the sensitive data is at least in part based on the policy.

Example A12 is the method of any of Example A8, further comprising: transmitting a policy request, at least in part based on a receipt of the API request.

Example A13 is the method of any of Examples A9-A11, further comprising: producing the non-sensitive data from sensitive data, at least in part based on the policy, wherein the API request further includes the sensitive data.

Example A14 is the method of any of Examples A8-A13, further comprising: performing the security service on the API request to produce a client artifact; and transmitting the client artifact.

In Example A15, a non-transitory, computer-readable medium is encoded with executable instructions that, when executed by a processing unit, perform operations comprising: receiving an application programming interface (API) request; transmitting a customer management request including an identifier of a security service and an identifier of an apparatus including the processing unit; receiving a customer management response including a policy; and performing the security service on the API request, at least in part based on the policy.

Example A16 is the medium of Example A15, the operations further comprising: transmitting a vendor service request including non-sensitive data; receiving a vendor service response including a vendor service result; and transmitting an API response, at least in part based on the vendor service result.

Example A17 is the medium of Example A16, the operations further comprising: performing the security service on sensitive data to produce a customer service result, wherein the API request further includes the sensitive data, and the API response is at least in part based on the customer service result.

Example A18 is the medium of Example A17, wherein the performing the security service on the sensitive data is at least in part based on the policy.

Example A19 is the medium of any of Examples A15-A18, the operations further comprising: transmitting a policy request, at least in part based on a receipt of the API request.

Example A20 is the medium of any of Examples A16-A18, the operations further comprising: producing the non-sensitive data from sensitive data, at least in part based on the policy, wherein the API request further includes the sensitive data.

Example A21 is the medium of any of Examples A15-A20, the operations further comprising: performing the security service on the API request to produce a client artifact; and transmitting the client artifact.

In Example B1, an apparatus includes a network interface that receives a customer management request including an identifier of a customer apparatus and an identifier of a first security service; and a processor configured to produce a policy, at least in part based on the identifier of the first security service, wherein the network interface transmits the policy, at least in part based on the identifier of the customer apparatus.

Example B2 is the apparatus of Example B1, wherein the network interface receives a vendor service request including non-sensitive data, the processor is configured to perform a second security service on the non-sensitive data to produce a vendor service result, and the network interface transmits a vendor service response including the vendor service result, at least in part based on the identifier of the customer apparatus.

Example B3 is the apparatus of Example B2, wherein the vendor service result is at least in part based on the identifier of the customer apparatus and the identifier of the first security service.

Example B4 is the apparatus of any of Examples B1-B3, wherein the network interface transmits the policy, at least in part based on a policy request.

Example B5 is the apparatus of Example B2 or B3, wherein the network interfaces receives a client artifact, and the processor further is configured to update the policy to produce an updated policy, at least in part based on the client artifact.

Example B6 is the apparatus of Example B5, wherein the processor further is configured to perform the second security service, at least in part based on the updated policy.

Example B7 is the apparatus of Example B5 or Example B6, wherein the network interface transmits the updated policy, at least in part based on the identifier of the customer apparatus.

In Example B8, a method includes receiving a customer management request including an identifier of a customer apparatus and an identifier of a first security service; producing a policy, at least in part based on the identifier of the first security service; and transmitting the policy, at least in part based on the identifier of the customer apparatus.

Example B9 is the method of Example B8, further comprising: receiving a vendor service request including non-sensitive data; performing a second security service on the non-sensitive data to produce a vendor service result; and transmitting a vendor service response including the vendor service result, at least in part based on the identifier of the customer apparatus.

Example B10 is the method of Example B9, wherein the vendor service result is at least in part based on the identifier of the customer apparatus and the identifier of the first security service.

Example B11 is the method of any of Examples B8-B10, further comprising: transmitting the policy, at least in part based on a policy request.

Example B12 is the method of Example B9 or Example B10, further comprising: receiving a client artifact; and updating the policy to produce an updated policy, at least in part based on the client artifact.

Example B13 is the method of Example B12, further comprising: performing the second security service, at least in part based on the updated policy.

Example B14 is the method of Example B12 or Example B13, further comprising: transmitting the updated policy, at least in part based on the identifier of the customer apparatus.

In Example B15, a non-transitory, computer-readable medium is encoded with executable instructions that, when executed by a processing unit, perform operations comprising: receiving a customer management request including an identifier of a customer apparatus and an identifier of a first security service; producing a policy, at least in part based on the identifier of the first security service; and transmitting the policy, at least in part based on the identifier of the customer apparatus.

Example B16 is the medium of Example B15, the operations further comprising: receiving a vendor service request including non-sensitive data; performing a second security service on the non-sensitive data to produce a vendor service result; and transmitting a vendor service response including the vendor service result, at least in part based on the identifier of the customer apparatus.

Example B17 is the medium of Example B16, wherein the vendor service result is at least in part based on the identifier of the customer apparatus and the identifier of the first security service.

Example B18 is the medium of any of Examples B15-B17, the operations further comprising: transmitting the policy, at least in part based on a policy request.

Example B19 is the medium of Example B16 or Example B17, the operations further comprising: receiving a client artifact; and updating the policy to produce an updated policy, at least in part based on the client artifact.

Example B20 is the medium of Example B19, the operations further comprising: performing the second security service, at least in part based on the updated policy.

Example B21 is the medium of Example B19 or Example B20, the operations further comprising: transmitting the updated policy, at least in part based on the identifier of the customer apparatus.

We claim:

1. An apparatus to distribute security services between a vendor infrastructure and a customer infrastructure, the apparatus comprising:
   a network interface to receive, from the vendor infrastructure associated with a security service in a hybrid cloud, a policy for performing the security service across the hybrid cloud;
   executable instructions; and
   one or more processor circuits to be programmed by the executable instructions to:
      cause the network interface to transmit a service request to the vendor infrastructure to process non-sensitive data at the vendor infrastructure, the non-sensitive data included in an application programming interface (API) request for the security service;
      maintain sensitive data included in the API request within the customer infrastructure without transferring the sensitive data outside the customer infrastructure; and
      process, at the customer infrastructure, the sensitive data with the security service based on (1) the policy and (2) a service result generated at the vendor infrastructure based on the service request, the sensitive data included in the API request.

2. The apparatus of claim 1, wherein the service result is a first service result, and the network interface is to:
   transmit the service request to the vendor infrastructure, the service request including the non-sensitive data;
   receive a service response from the vendor infrastructure, the service response including the first service result; and
   transmit an API response, the API response based on a second service result generated by the security service.

3. The apparatus of claim 2, wherein at least one of the one or more processor circuits is to separate the API request into the non-sensitive data and the sensitive data based on the policy.

4. The apparatus of claim 1, wherein the network interface is to transmit a policy request based on a receipt of the API request.

5. The apparatus of claim 1, wherein:
   at least one of the one or more processor circuits is to produce a client artifact based on processing the sensitive data with the security service; and
   the network interface is to transmit the client artifact.

6. The apparatus of claim 1, wherein the non-sensitive data at least one of a workload configuration or a checksum of a file, the workload configuration including at least one of an allowed length of a password, whether special characters are allowed for the password, or which of the special characters are allowed for the password.

7. The apparatus of claim 1, wherein the sensitive data includes at least one of an internet protocol address, a tag, a user identifier, or personally identifiable information.

8. A method to distribute security services between a vendor infrastructure and a customer infrastructure, the method comprising:

receiving, from the vendor infrastructure associated with a security service in a hybrid cloud, a policy for performing the security service across the hybrid cloud;

transmitting a service request to the vendor infrastructure to process non-sensitive data at the vendor infrastructure, the non-sensitive data included in an application programming interface (API) request for the security service;

maintaining sensitive data included in the API request within the customer infrastructure without transferring the sensitive data outside the customer infrastructure; and processing, at the customer infrastructure, the sensitive data with the security service based on (1) the policy and (2) a service result generated at the vendor infrastructure based on the service request.

9. The method of claim 8, wherein the service result is a first service result, and the method further includes:

transmitting the service request to the vendor infrastructure, the service request including the non-sensitive data;

receiving a service response from the vendor infrastructure, the service response including the first service result; and transmitting an API response, the API response based on a second service result generated by the security service.

10. The method of claim 9, further including separating the API request into the non-sensitive data and the sensitive data based on the policy.

11. The method of claim 8, further including transmitting a policy request based on a receipt of the API request.

12. The method of claim 8, further including:

producing a client artifact based on processing the sensitive data with the security service; and transmitting the client artifact.

13. The method of claim 8, wherein the non-sensitive data at least one of a workload configuration or a checksum of a file, the workload configuration including at least one of an allowed length of a password, whether special characters are allowed for the password, or which of the special characters are allowed for the password.

14. The method of claim 8, wherein the sensitive data includes at least one of an internet protocol address, a tag, a user identifier, or personally identifiable information.

15. A non-transitory computer-readable medium comprising executable instructions that cause one or more processor circuits to:

receive, from a vendor infrastructure associated with a security service in a hybrid cloud, a policy for performing the security service across the hybrid cloud;

cause transmission of a service request to the vendor infrastructure to process non-sensitive data at the vendor infrastructure, the non-sensitive data included in an application programming interface (API) request for the security service;

maintain sensitive data included in the API request within a customer infrastructure without transferring the sensitive data outside the customer infrastructure; and process, at the customer infrastructure, the sensitive data with the security service based on (1) the policy and (2) a service result generated at the vendor infrastructure based on the service request.

16. The non-transitory computer-readable medium of claim 15, wherein the service result is a first service result, and the executable instructions cause at least one of the one or more processor circuits to:

cause transmission of the service request to the vendor infrastructure, the service request including the non-sensitive data;

access a service response from the vendor infrastructure, the service response including the first service result; and cause transmission of an API response, the API response based on a second service result generated by the security service.

17. The non-transitory computer-readable medium of claim 16, wherein the executable instructions cause at least one of the one or more processor circuits to separate the API request into the non-sensitive data and the sensitive data based on the policy.

18. The non-transitory computer-readable medium of claim 15, wherein the executable instructions cause at least one of the one or more processor circuits to transmit a policy request based on a receipt of the API request.

19. The non-transitory computer-readable medium of claim 15, wherein the non-sensitive data at least one of a workload configuration or a checksum of a file, the workload configuration including at least one of an allowed length of a password, whether special characters are allowed for the password, or which of the special characters are allowed for the password.

20. The non-transitory computer-readable medium of claim 15, wherein the sensitive data includes at least one of an internet protocol address, a tag, a user identifier, or personally identifiable information.

* * * * *

UNITED STATES PATENT AND TRADEMARK OFFICE
CERTIFICATE OF CORRECTION

PATENT NO. : 12,483,593 B2
APPLICATION NO. : 17/721038
DATED : November 25, 2025
INVENTOR(S) : Bhattacharya et al.

Page 1 of 1

It is certified that error appears in the above-identified patent and that said Letters Patent is hereby corrected as shown below:

In the Claims

Column 18, Lines 33-34, Claim 1, delete ", the sensitive data included in the API request"

Signed and Sealed this
Sixth Day of January, 2026

John A. Squires
*Director of the United States Patent and Trademark Office*